US009438099B2

(12) United States Patent
Barthold

(10) Patent No.: US 9,438,099 B2
(45) Date of Patent: Sep. 6, 2016

(54) HARMONIC DISPLACEMENT REDUCTION

(71) Applicant: Fred O. Barthold, Leucadia, CA (US)

(72) Inventor: Fred O. Barthold, Leucadia, CA (US)

( * ) Notice: Subject to any disclaimer, the term of this patent is extended or adjusted under 35 U.S.C. 154(b) by 38 days.

(21) Appl. No.: 14/527,309

(22) Filed: Oct. 29, 2014

(65) Prior Publication Data

US 2015/0194874 A1 Jul. 9, 2015

Related U.S. Application Data

(60) Provisional application No. 61/925,511, filed on Jan. 9, 2014.

(51) Int. Cl.
*H02M 1/32* (2007.01)
*H02M 1/12* (2006.01)
*H02M 3/335* (2006.01)
*H02M 1/00* (2006.01)

(52) U.S. Cl.
CPC ............... *H02M 1/12* (2013.01); *H02M 3/335* (2013.01); *H02M 2001/0058* (2013.01); *Y02B 70/1433* (2013.01); *Y02B 70/1491* (2013.01)

(58) Field of Classification Search
CPC ........ H02M 1/12; H02M 1/32; H02M 3/335; H02M 2001/0058
See application file for complete search history.

(56) References Cited

U.S. PATENT DOCUMENTS

| | | | |
|---|---|---|---|
| 3,553,620 A | 1/1971 | Cielo et al. | |
| 4,801,775 A | 1/1989 | Cornell | |
| 5,436,818 A | 7/1995 | Barthold | |
| 5,500,576 A * | 3/1996 | Russell | G05F 1/70 315/206 |
| 5,719,544 A | 2/1998 | Vinciarelli et al. | |
| 6,069,801 A | 5/2000 | Hodge et al. | |
| 6,094,038 A | 7/2000 | Lethellier | |
| 6,304,065 B1 | 10/2001 | Wittenbreder | |
| 6,362,986 B1 | 3/2002 | Schultz et al. | |
| 6,515,883 B2 | 2/2003 | Wade | |
| 6,545,450 B1 | 4/2003 | Ledenev et al. | |
| 6,653,924 B2 | 11/2003 | Vinciarelli et al. | |
| 6,882,548 B1 | 4/2005 | Jacobs et al. | |
| 7,049,786 B1 | 5/2006 | Toliyat et al. | |
| 7,098,648 B2 | 8/2006 | Krieger et al. | |
| 7,183,754 B2 | 2/2007 | Tsuruya | |
| 7,218,081 B2 | 5/2007 | Jang et al. | |
| 7,602,165 B2 | 10/2009 | Watanabe et al. | |
| 7,777,458 B2 | 8/2010 | Barthold | |
| 7,812,577 B2 | 10/2010 | Barthold | |
| 7,830,684 B2 | 11/2010 | Taylor | |
| 7,936,244 B2 | 5/2011 | Hansen | |
| 2002/0054499 A1 | 5/2002 | Tanaka et al. | |

(Continued)

OTHER PUBLICATIONS

Infineon, "Improving Efficiency of Synchronous Rectification by Analysis of the MOSFET Power Loss Mechanism", Application Note, Rev. 2.0, Jun. 2009.

(Continued)

*Primary Examiner* — Jessica Han
(74) *Attorney, Agent, or Firm* — Van Pelt, Yi & James LLP

(57) ABSTRACT

Reducing voltage excursions in a circuit comprises: performing resonant commutation, including transferring, via a first set of one or more diodes, energy stored by a set of one or more parasitic inductances to a set of one or more capacitors; and performing recovery-to-load, including discharging energy stored in the set of one or more capacitors via a second set of one or more diodes, through the set of one or more parasitic inductances to a load of the circuit.

17 Claims, 5 Drawing Sheets

(56) References Cited

U.S. PATENT DOCUMENTS

| | | | |
|---|---|---|---|
| 2005/0286271 | A1 | 12/2005 | Vinciarelli |
| 2006/0279970 | A1 | 12/2006 | Kernahan |
| 2007/0103122 | A1 | 5/2007 | Morong et al. |
| 2008/0001695 | A1 | 1/2008 | Riggio et al. |
| 2009/0174376 | A1 | 7/2009 | Barthold |
| 2012/0140525 | A1 | 6/2012 | Cuadra et al. |
| 2012/0176103 | A1 | 7/2012 | Lizarazo et al. |
| 2012/0182772 | A1* | 7/2012 | Hosokawa .......... H02M 1/4208 323/222 |
| 2014/0346880 | A1* | 11/2014 | Hosokawa ............ H02M 3/335 323/222 |

OTHER PUBLICATIONS

Infineon, "Infineon OptiMOSTM Power MOSFET Datasheet Explanation", Application Note AN Mar. 2012, V1.1 Mar. 2012.
Infineon, Optimum MOSFET Selection for Synchronous Rectification, Application Note AN May 2012, V2.4, May 2012.
Infineon, "Simple Design Techniques for Optimizing Efficiency and Overvoltage Spike of Synchronous Rectification in DC to DC Converters", Application Note, Rev. 2.0, May 2010.
E. E. Landsman. "A Unifying Derivation of Switching DC-DC Converter Topologies", PESC '79 Record, San Diego, Calif., Jun. 18-22, 1979, pp. 239-243.
R. Lee. "Electronic Transformers and Circuits" (second edition), John Wiley & Sons, New York, N. Y., 1961. pp. 102 & 204.
Middlebrook et al., "Advances in Switched-Mode Power Conversion", vols. I and II, 1983, pp. 205-218.
Yao et al., "Tapped-Inductor Buck Converters with a Lossless Clamp Circuit", APEC 2002 Proceedings, Dallas, Tex., Mar. 10-14, 2002, pp. 693-698.
P. Zumel, "Magnetic Integration for Interleaved Converters", APEC 2002 Proceedings, Miami Beach, Fla., Feb. 9-13, 2003, pp. 1143-1149.
Massey et al., "High Voltage Single-Ended DC-DC Converter", PESC 77, Jun. 1977, Record, p. 159, Table 1.
George Schuellein, " Multiphase Buck Converter Design Responds Well to Transients", http://www.planetanalog.com/printableArticle.hjtml?articleID=12801317, Jun. 20, 2006, pp. 1-13.
John Clarkin, "Design of a 50A Multi-phase Converter", HFPC '99 Proceedings, Ventura, CA, Nov. 1999, pp. 414-420.
Carl Smith, "How to Achieve New Standards in DC-DC Converter Efficiency for Computer Applications", HFPC '99 Proceedings, Ventura, CA, Nov. 1999, pp. 152-158.
Leu et al, "A Novel Forward Configuration for DC-DC Application: Built-in Input Filter Forward Converter (BIFFC)", APEC '95 Proceedings, Dallas, TX, Mar. 5-9, 1995, pp. 43-49.
Wei et al., "A High Efficiency Topology for 12V VRM-Push-Pull Buck and Its Integrated Magnetics Implementations", APEC 2002 Proceedings, Dallas, TX, Mar. 10-14, 2002, pp. 679-685.
Xu et al., "Investigation of Candidate Topologies for 12V VRM", APEC 2002 Proceedings, Dallas, TX, Mar. 10-14, 2002, pp. 686-692.
Ye et al. "Investigation of Topology Candidates for 48V VRM", APEC 2002 Proceedings, Dallas, TX, Mar. 10-14, 2002, pp. 699-705.
Takagi et al. "Ultra High Efficiency of 95% for DC/DC Converter—Considering Theoretical Limitation of Efficiency", APEC 2002 Proceedings, Dallas, TX, Mar. 10-14, 2002, pp. 735-741.
Abu-Qahouq et al. "Novel Transient Cancellation Control Method for Future Generation of Microprocessors", APEC 2002 Proceedings, Dallas, TX Mar. 10-14, 2002, pp. 216-222.
Yao et al., "Optimal Design of the Active Droop Control Method for the Transient Response", APEC 2003 Proceedings, Miami Beach, FL, Feb. 9-13, 2003, pp. 718-723.
Wei et al. "A Novel Soft-Switched High-Frequency, High-Efficiency, High-Current 12V Voltage Regulator—The Phase-Shift Buck Converter", APEC 2003 Proceedings, Miami Beach, FL, Feb. 9-13, 2003, pp. 724-730.
Tolle et al., "De-Embedding of Reverse Recovery Losses in Fast Switching Vrm Applications", APEC 2003 Proceedings, Miami Beach, FL, Feb. 9-13, 2003, pp. 958-963.
Chen et al., Integration of Electromagnetic Passive Components in DPS Front-End DC/DC Converter—A Comparative Study of Different Integration Steps, APEC 2003 Proceedings, Miami Beach, FL, Feb. 9-13, 2003, pp. 1137-1142.
Jensen et al., "Optimal Core Dimensional Ratios for Minimizing Winding Loss in High-Frequency Gapped-Inductor Windings", APEC 2003 Proceedings, Miami Beach, FL, Feb. 9-13, 2003, pp. 1164-1169.
Yao et al., "A Family of Buck-Type DC-DC Converters with Autotransformers", APEC 2003 Proceedings, Miami Beach, FL, Feb. 9-13, 2003, pp. 114-120.
Li et al., "Using Coupled Inductors to Enhance Transient Performance of Multi-Phase Buck Converters", APEC 2004 Proceedings, Anaheim, CA, Feb. 22-26, 2004, pp. 1289-1293.
Zhao et al., "Characterization of Cdv/dt Induced Power Loss in Synchronous Buck DC-DC Converters", APEC 2004 Proceedings, Anaheim, CA, Feb. 22-26, 2004, pp. 292-297.
Ren et al., "Analysis of the Power Delivery Path from the 12 V VR to the Microprocessor", APEC 2004 Proceedings, Anaheim, CA, Feb. 22-26, 2004, pp. 285-291.
Thomas et al., "Federal Purchasing: Leading the Market for Low Standby Products", APEC 2004 Proceedings, Anaheim, CA, Feb. 22-26, 2004, pp. 318-322.
Narveson et al., "Why the Market is Ready for a Non-Isolated DC/DC Power Module Standard", APEC 2004 Proceedings, Anaheim, CA, Feb. 22-26, 2004, pp. 335-341.
Gaboriault et al., "A High Efficiency, Non-Inverting, Buck-Boost DC-DC Converter", APEC 2004 Proceedings, Anaheim, CA, Feb. 22-26, 2004, pp. 1411-1415.
Edward Herbert, "Analysis of the Near Zero Input Current Ripple Condition in a Symmetrical Push-Pull Converter", HFPC 1989 Proceedings, Naples, FL, May 14-17, 1989, pp. 357-371.
John D. Repp, "Ultra Fast Isolated Gate Drive Circuit", HFPC 1989 Proceedings, Naples, FL, May 14-17, 1989, pp. 438-445.
Prentice et al., "High Frequency, Low Cost Gate Drive Integrated Circuit", HFPC 1991 Proceedings, Toronto, Ontario, Canada, Jun. 9-14, 1991, pp. 72-80.
Laszlo Balogh, "Design and Application Guide for High Speed MOSFET Gate Drive Circuits", Texas Instruments, 2002, pp. 2-1 to 2-39.
Sawle et al., "A Proprietary New Source Mounted Power Package for Board Mounted Power", International Rectifier. Europe 2001.
Pavier et al., "Understanding the Effect of Power MOSFET Package Parasitics on VRM Circuit Efficiency at Frequencies above 1 MHz.", PCIM Europe 2003.
Yang et al., "Effect and Utilization of Common Source Inductance in Synchronous Rectification", APEC 2005 Proceedings, Austin, TX, Mar. 6-10, 2005, pp. 1407-1411.
Yang et al., "A Novel Nonisolated Half Bridge DC-DC Converter", APEC 2005 Proceedings, Austin, TX, Mar. 6-10, 2005, pp. 301-307.
Michael G. Laflin, "How to Simplify Switch-Mode DC-DC Converter Design", CMP Media LLC. Sep. 27, 2006.
Qiu et al., "High-Bandwidth Designs for Voltage Regulators with Peak-Current Control", APEC 2006 Proceedings, Dallas, TX, Mar. 19-23, 2006, pp. 24-30.
Wang et al, "Active Transient Voltage Compensator Design for VR Load Line Improvement", APEC 2006 Proceedings, Dallas, TX, Mar. 19-23, 2006, pp. 59-64.
Alan Elbanhawy, "Buck Converter Losses Under the Microscope", Power Electronics Technology, Feb. 2005, pp. 24, 26-30, 32.
"Comparison of SEPIC and Buck EMI", Fairchild Power Seminar 2006 Presentation Guide, p. 3-17.
Ray Ridley, California Power Research Modeling of BPS4 Topology, Revised Aug. 17, 2000.
E. Stanford, "New Processors Will Require New Powering Technologies", Power Electronics Technology, Feb. 2002, p. 40.

(56) References Cited

OTHER PUBLICATIONS

Michael J. Johnson, "Improvement of Stability in Current-Programmed Sepic DC/DC Converters", APEC '91 Conference Proceedings, Dallas, TX, Mar. 10-15, 1991, pp. 452-458.

Severns et al., "Modern DC-to-DC Switchmode Power Converter Circuits", Van Nostrand Reinhold Company, New York, NY, 1985, p. 159.

L. H. Dixon, "The Right-Half-Plane Zero—A Simplified Explanation", Unitrode Switching Regulator Power Supply Design Seminar Manuel (SEM-500), Lexington, MA, 1986, p. C2-1.

"Switching Power Supply Topology Review", Unitrode Switching Regulated Power Supply Design Seminar Manual (SEM-500), Lexington, MA, 1986, p. C3-8.

Steve Mappus, "Predictive Gate Drive Frequently Asked Questions", Texas Instruments Application Report, SLUA285—Feb. 2003.

TPS28225, "High-Frequency 4-A Sink Synchronous MOSFET Driver", SLUS710 May 2006, Texas Instruments, www.TI.com.

Yousefzadeh et al, "Minimum Phase Response in Digitally Controlled Boost and Flyback Converters", APEC 2007 Proceedings, Anaheim, CA, Feb. 28-Mar. 1, 2007, pp. 865-893.

\* cited by examiner

HARMONIC DISPLACEMENT REDUCTION

CROSS REFERENCE TO OTHER APPLICATIONS

This application claims priority to U.S. Provisional Patent Application No. 61/925,511 entitled HARMONIC DISPLACEMENT REDUCTION OF SOURCED ALTERNATING CURRENTS FROM THE ISOLATED, MULTIPHASE, BUCK-BOOST CONVERTER filed Jan. 9, 2014 which is incorporated herein by reference in its entirety for all purposes.

BACKGROUND OF THE INVENTION

Magnetic field coupling is inherently an imperfect process. The imperfection causes "leakage." Specifically, the interstitial and uncoupled parasitic field element that exists as an inductive energy storage device ($LI^2$) enables leakage energy. For example, power converters often have leakage magnetic fields which cause undesirable voltage excursions and loss in efficiency. Existing techniques to contain the leakage magnetic fields typically have substantial transactional loss due to the use of resistive or reactive elements.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
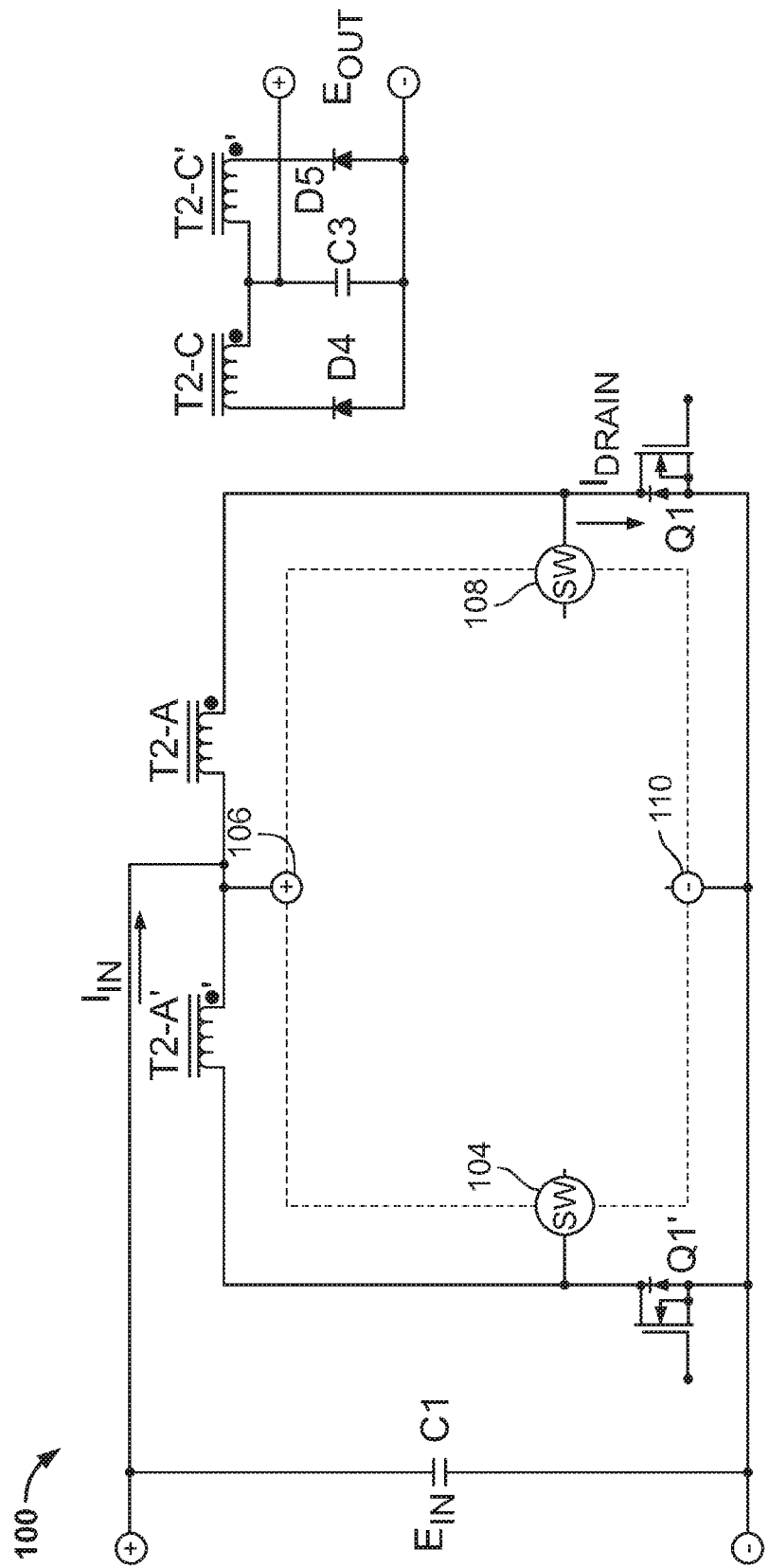
FIG. 1A is a block diagram illustrating an embodiment of a power converter circuit with leakage.

FIG. 1A is a block diagram illustrating an embodiment of a power converter circuit with leakage. Circuit 100 is a two-phase, single magnetic, buck-boost converter. $E_{IN}$ provides a direct current (DC) source. The DC source is converted by circuit 100 into AC so that the current can be transformed. The current is then converted back into DC, as output $E_{OUT}$. The converter circuit 100 includes two switches Q1 and Q1' that are switched using sequential switching signals, and alternating current (AC) is generated. Inductive windings labeled T2-A, T2-A', T2-C and T2-C' cause leakage. For example, when Q1 is switched on, a current flows in T2-A, causing leakage energy ($LI^2$) to be stored. When Q1 switches off, the leakage energy is released to switches Q1 and Q1'. The leakage energy can damage switches Q1 and Q1' and therefore should be contained. Existing techniques to contain the leakage energy typically employ resistive (dissipative) or reactive (pseudo-lossless) means. The former involves inserting resistors to dissipate the leakage energy, and the latter involves adding inductors or capacitors to redirect energy to the energy source $E_{IN}$. In either case, the leakage energy is lost due to dissipation or transaction and not delivered to the load.

A circuit implementing an LDC/CDL sequence to provide resonant commutation and recovery-to-load functions is used to contain or capture the leakage energy and redirect the leakage energy to the load. As used herein, resonant commutation refers to redirecting a current and changing its path (e.g., from a switch to one or more diodes and/or one or more capacitors) at a commutation interval that is determined by the circuit's resonant frequency. Embodiments of LDC/CDL circuits (also referred to as a Harmonic Displacement Reduction (HDR) circuits) coupled to isolated, multi-phase boost derived DC-DC converters and the operations of the LDC/CDL circuits are described. As used herein, isolated means that there is an electrical barrier separating the input and output. In a multi-phase converter, switches are turned on and off according to a switching sequence. In some embodiments, current only flows through one switch at a time.

The HDR circuit performs resonant commutation and recovery-to-load of the energy content in the magnetic and circuit inductive parasitics in the isolated, multi-phase boost derived DC-DC converter topologies (e.g., buck-boost, flyback, Sepic, Sepic-fed buck, etc.) in either continuous or discontinous mode. The boost derived DC-DC converter topologies have the common characteristic of having a D term in the denominators of their respective transfer functions. Several two-phase examples are shown below, although the technique is generally applicable to N-phase boost derived DC-DC converters (N being an integer >1).

The HDR circuit delivers the leakage energy to the load (Eout) of the converter, and accomplishes the following in conjunction with the DC-DC converters: (1) establishment of magnetic and circuit inductive parasitics as parameters of utility; (2) functional elimination of the primary-to-secondary current commutation interval; (3) reduction in volume and losses in the power magnetic structure; (4) compelling simplification of the power magnetic construction; (5) reduction of primary switch voltage stress to the near theoretical; (6) reduction of the peak-to-peak and rms currents in the windings, rectifiers and filter capacitors; (7) elimination of source pollution by converter commutation currents; (8) reduction of harmonic current spectrum; (9) near zero current and zero voltage switching of recovery to load current component; and (10) an overall reduction in power component voltage, current, and thermal requirements.

The HDR circuit carries out a sequence of operations referred to as an LDC/CDL sequence for harmonic displacement commutation and recovery-to-load of inductive parasitic current. As used herein, L=parasitic inductance, C=discrete capacitance, D=diode rectifiers, $1/(2\pi\sqrt{LC})$=harmonic frequency, I=current in parasitic inductance. In a converter topology including the HDR circuit, the LDC/CDL sequence works as follows: in a first state during in the LDC portions of the sequence, the leakage energy from parasitic inductive windings (L) is commutated (redirected) via one or more diodes (D) to one or more capacitors (C). Subsequently, in a second state during the CDL part of the sequence, the energy stored in the one or more capacitors (C) is directed to the load via the one or more diodes (D) and the inductor (L).

The diode rectifier function of this current commutation sequence may be accomplished by a dedicated active switch (e.g., a field effect transistor (FET), or any other appropriate switching device), when timing and losses so dictate. In some embodiments, the use of appropriate dielectric (e.g., COG dielectric) in the discrete capacitance insures harmonic frequency stability as well as minimum loss. The energy processed through C is $(I\sqrt{L/C})^2Cf$, where f is the converter frequency in Hz. The transaction loss is determined by the loss characteristics of L, D, C and attendant interconnects. The power switch drain voltage excursion is $[E_{IN}+E_{OUT}+(0.5I\sqrt{L/C})]$. This LDC/CDL sequence may be implemented in various circuit embodiments to provide resonant commutation (through the LDC sequence) and recovery-to-load (through the CDL sequence) of inductive parasitic energy ($LI^2$) in the isolated, multi-phase, boost derived DC-DC converter topologies.

Figure 1B:
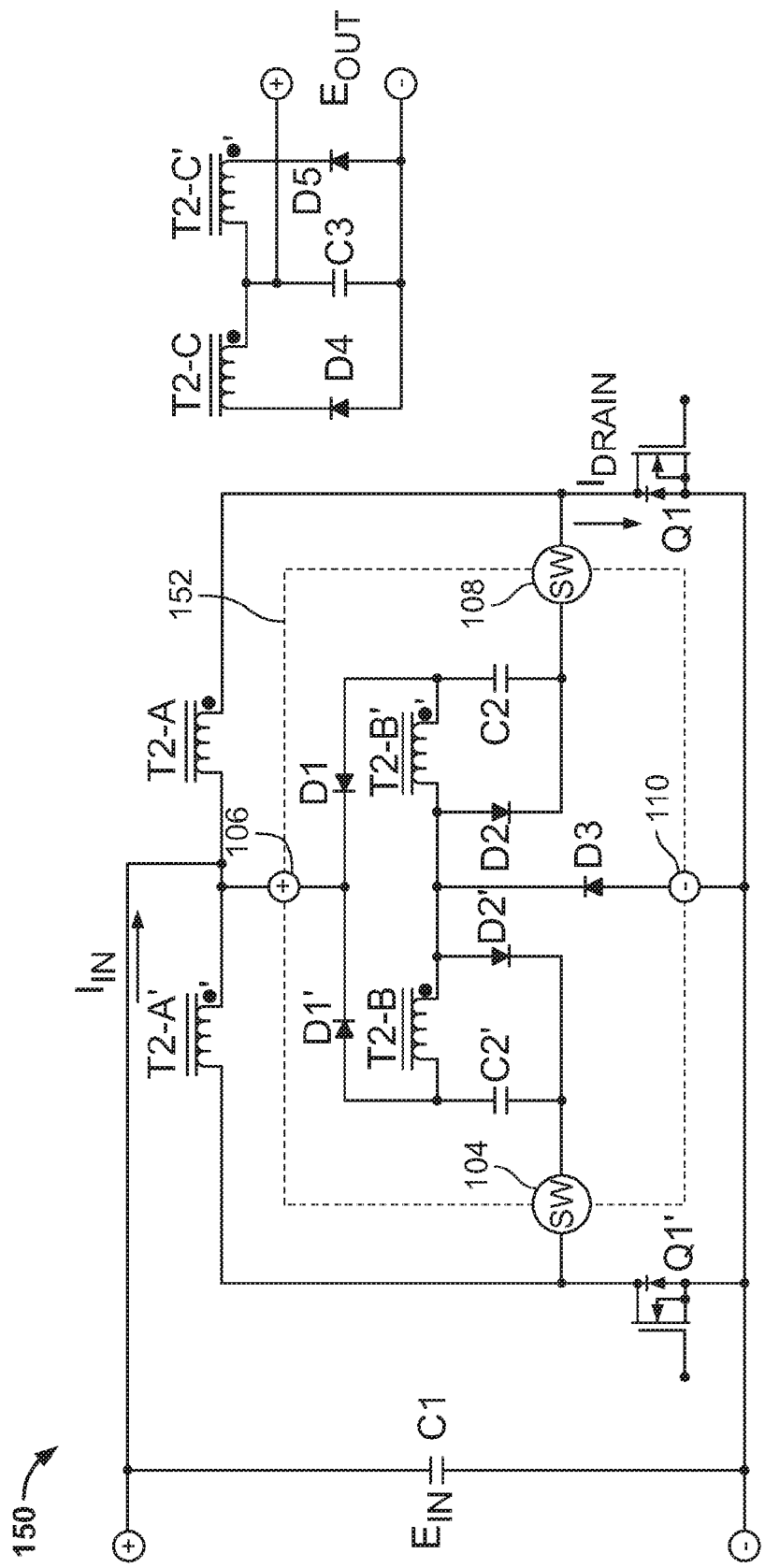
FIG. 1B is a block diagram illustrating an embodiment of a DC-DC converter comprising a HDR circuit.

FIG. 1B is a block diagram illustrating an embodiment of a DC-DC converter comprising a HDR circuit. In FIG. 1A, connections 104-110 illustrate connection points that can be connected to a HDR circuit. In FIG. 1B, the converter shown in FIG. 1A is connected with an embodiment of a HDR circuit 152 at connection points 104-110. Specifically, the HDR circuit includes a set of inductors T2-B and T2-B' that are magnetically coupled with T2-A' and T2-A, a set of capacitors C2 and C2', and diodes D1, D1', D2, D2', and D3.

Switches Q1 and Q1' are controlled by a controller that sends out control signals (e.g., clock signals) to turn the switches on and off. The inductors, capacitors, and diodes are configured to perform the LDC/CDL sequence which is described in greater detail below. The HDR circuit accepts alternating currents generated based on a DC current source Ein. By performing the LDC/CDL sequence, the HDR circuit achieves harmonic displacement reduction of AC sourced from converter 100.

Figure 2:
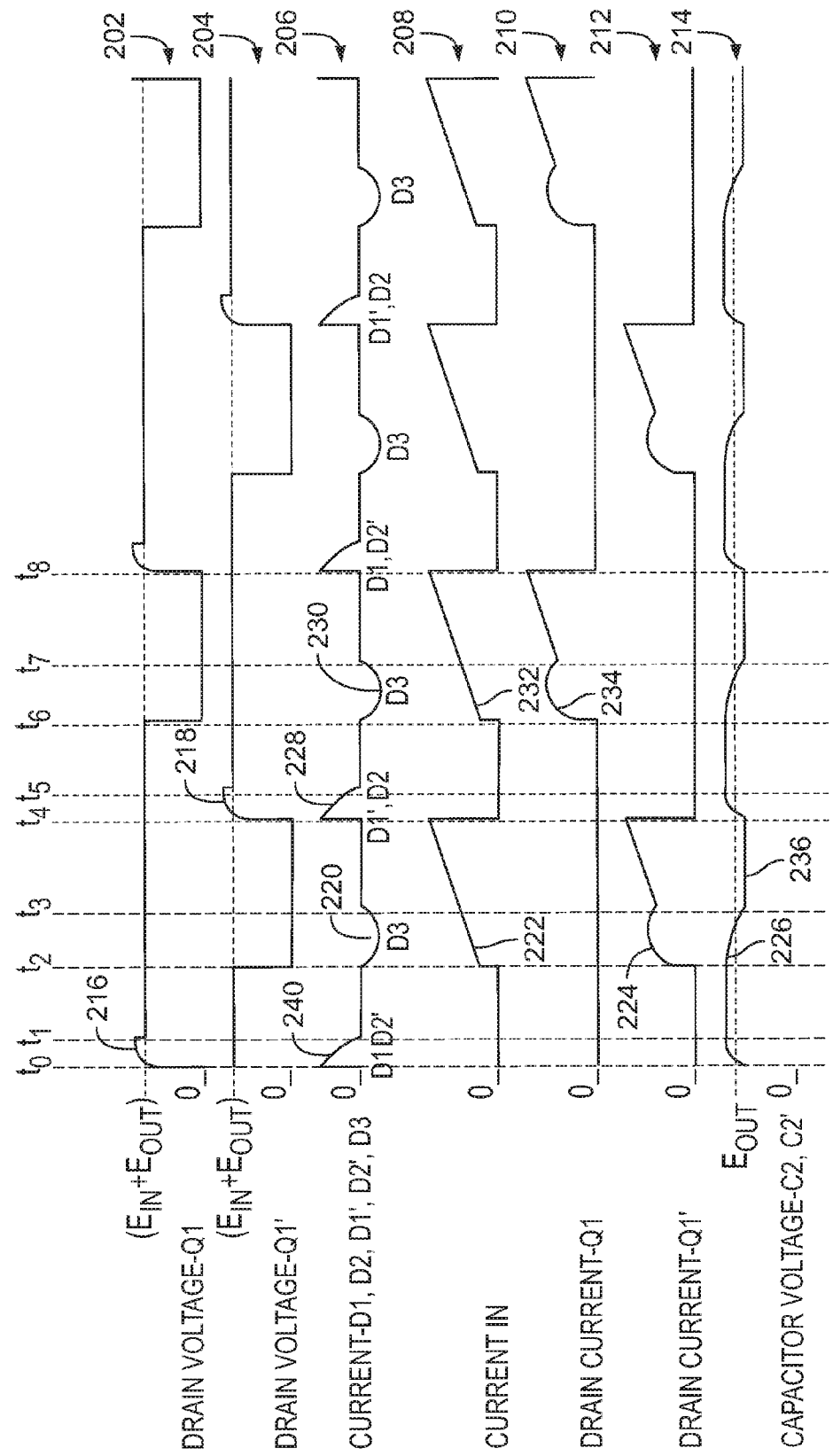
FIG. 2 illustrates a set of time-based wave forms illustrating voltages and currents at various locations on circuit 150 of FIG. 1B.

FIG. 2 illustrates a set of time-based wave forms illustrating voltages and currents at various locations on circuit 150 of FIG. 1B.

Wave forms 202 and 204 illustrate the drain voltages across switches Q1 and Q1', respectively. Since the circuit has a two-phase configuration, Q1 and Q1' are switched on and off in an alternating pattern. In particular, power switch drain voltage excursion for Q1 and Q1' is limited to $[E_{IN}+E_{OUT}+(0.5I\sqrt{L/C})]$ (see 216 and 218), which is small compared to that of circuit 100.

Waveform 206 illustrates the current activities in diodes D1, D2, and D3.

Waveform 208 illustrates the current of $I_{IN}$.

Waveforms 210 and 212 illustrate the drain current in Q1 and Q1', respectively.

Waveform 214 illustrates the capacitor voltages of C2 and C2', which are identical. The voltages of C2 and C2' are due to current being transferred to C2 and C2'. The energy is stored on the capacitors until Q1' is switched on, at which time the energy is discharged in a half cycle of resonance. Thus, compared with the charging of the current, the discharging of current is accomplished through the same L and C values, is of twice the duration, but only half the amplitude.

Figure 3:
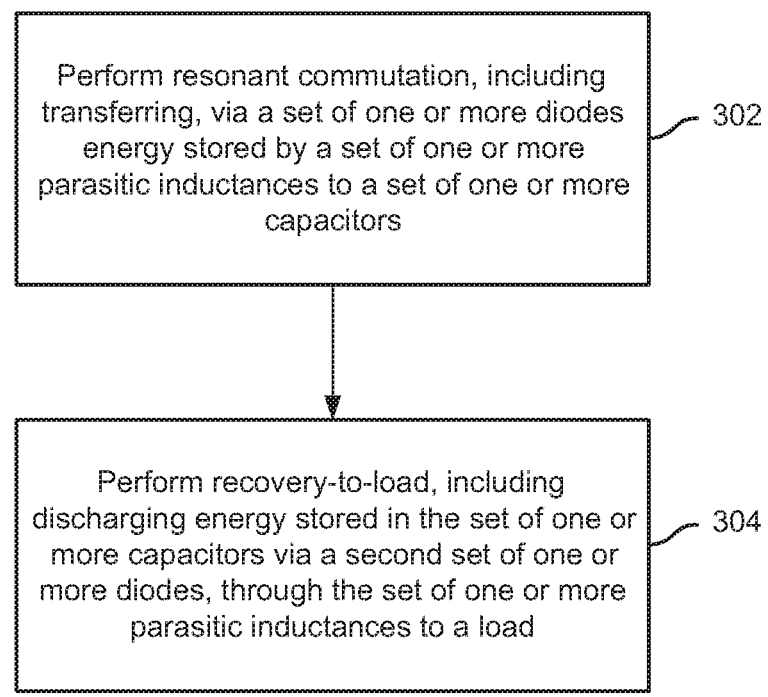
FIG. 3 is a flowchart illustrating an embodiment of an LDC/CDL process.

FIG. 3 is a flowchart illustrating an embodiment of an LDC/CDL process. Process 300 can be performed by a HDR circuit such as 152 of FIG. 1B or 402 of FIG. 4. The process is explained in connection with FIG. 1B and FIG. 2.

At 302, resonant commutation is performed. In some embodiments, resonant commutation includes transferring, via a first set of one or more diodes, energy stored by a set of one or more parasitic inductances to a set of one or more capacitors. The parasitic inductances and the capacitors have a resonant frequency, which determines how long the commutation interval lasts.

Referring to the example circuit of FIG. 1B, when Q1 is switched on, the drain voltage of Q1 is low, a current flows through Q1 and through T2-A, and energy is stored (this is the L portion of the LDC process). Note that the parasitic inductance L does not necessarily exist as a physical component, but is a measure of the coupling properties of inductor T2 because the parasitic inductance L exists as interstitial parasitic inductance of the magnetic windings of T2. When Q1 is switched off, the current that was previously flowing through Q1 ceases to flow through Q1, and is commutated through D1 (D portion of LDC) and charges C2 (C portion of LDC). Since C2' is in parallel with C2, any energy transferred to C2 is also transferred to C2'.

Referring to FIG. 2, the L portion of the LDC process takes place immediately prior to time t0, when switch Q1 is on and switch Q1' is off. Q1 draws current, and energy is stored in the parasitic inductances. The D and C portion of the LDC process takes place starting at time t0, when switch Q1 is switched off and switch Q1' remains off. The drain voltage of Q1 jumps, as illustrated by portion 216 of waveform 202. The current flows through D1' and D2 to charge capacitors C2 and C2', as illustrated by 240 of waveform 206. Since 240 is a quarter sine at the resonant frequency, the circuit is said to commutate at a quarter cycle of the resonant period. The voltage across the capacitors does not increase in a linear fashion. The rate of increase is greatest when the current of waveform 206 is the greatest. Voltage Eout increases until the capacitors are charged at time t1, at which time energy is contained in the capacitors and the circuit enters a quiescent state as shown in the portion labeled 226 in waveform 214. Neither switch Q1 nor switch Q1' is turned on during the quiescent period. As shown in waveforms 208, 210, and 212, respectively, input current $I_N$, drain current Q1, and drain current Q1' are all zero during the quiescent period. The drain voltages for switches Q1 and Q1' are both at a set level ($E_{in}+E_{out}$).

Returning to process 300 of FIG. 3, at 304, recovery-to-load is performed. In some embodiments, recovery-to-load includes discharging energy stored in the set of one or more capacitors via a second set of one or more diodes, through the set of one or more parasitic inductances to a load.

Referring to the example circuit of FIG. 1B, on the next interval, Q1' is switched on, energy is discharged from C2 and C2' (the C portion of the CDL process) via D3 (the D portion of CDL process), which energy is transferred from the primary windings to the secondary windings T2-C (the L portion of CDL) and thus transferred to the load.

Referring to FIG. 2, the CDL process starts at time t2, when Q1' is switched on while Q1 remains off. As shown in waveform 204, the drain voltage of Q1' drops to 0 at this time. The energy stored in capacitors C2 and C2' is discharged through D3 to load. This is the commutation current (also referred to as redirected current), which is labeled 220 in waveform 206. Since 220 is a half sine wave at the resonant frequency (with an amplitude that is half of 240), the circuit is said to deliver to load at a half cycle. In addition, as shown in waveform 208, there is a current 222 extracted from current source $E_{IN}$. The drain current Q1', which is the sum of the commutation current and the sourced current, is labeled 224 in waveform 212. Capacitors C2 and C2' are discharged, and voltage across the capacitors decreases, as shown in the portion labeled 226 in waveform 214. At time t3, the capacitors are discharged until no more current can be drained to the load from the capacitors, as shown in the portion labeled 236 in waveform 214. At this point, current is only drained from the source, as waveform 208 $E_{IN}$ shows. In waveform 214, the voltage across the capacitors drops below $E_{OUT}$, by an amount that depends on the values of the parasitic inductance L and capacitance C. The CDL process completes.

Process 300 is repeated on the next half-cycle. Prior to time t4, Q1' continues to draw current and energy is stored in parasitic inductances. At time t4, switch Q1' is switched off, and switch Q1 remains off. The drain voltage of Q1' jumps, as illustrated by portion 218 of waveform 204. The current flows through D1' and D2 to charge capacitors C2 and C2' (the LDC process), as illustrated by portion 228 of waveform 206. Voltage Eout increases until the capacitors are charged. At this point (time t5), the circuit enters a quiescent state.

At time t6, switch Q1 is switched on while Q1' remains off. As shown in waveform 204, the drain voltage of Q1 drops to 0 at this time. The energy stored in capacitors C2 and C2' is discharged through D3 to load (the CDL process). The commutation current (also referred to as redirected current) is labeled 230 in waveform 206. In addition, as shown in waveform 208, there is a current 232 extracted from current source $E_{IN}$. The drain current Q1, which is the sum of the commutation current and the sourced current, is labeled 234 in waveform 210. Capacitors C2 and C2' are discharged, and voltage $E_{OUT}$ across the capacitors decreases until the capacitors are discharged, as shown in the portion labeled 236 in waveform 214.

At time t7, the capacitors are discharged until no more current can be drained to the load from the capacitors. At this point, current is only drained from the source, as waveform 208 $E_{IN}$ shows.

A full switching cycle completes and a new cycle repeats at t8.

In converter circuits with FET-based switches Q1 and Q1', FET losses are directly related to the drive requirements, and loss current characteristics are directed to voltage rating. Thus, it is generally preferable to use FETs with lower voltage rating. The reduction of excursion voltage permits the use of devices with lower voltage ratings and better characteristics. For example, assume that the maximum input voltage $E_{in}$ is 72 v and the maximum output voltage $E_{out}$ is 24 v, which add up to 96 v. The HDR circuit can keep the excursion portion of the output voltage to under 4 volts, allowing 100 v FET to be used for Q1 and Q2 in the converter circuit. Without the HDR circuit to reduce the excursion voltage, 150 v FET or even 200 v FET would have to be used.

Figure 4:
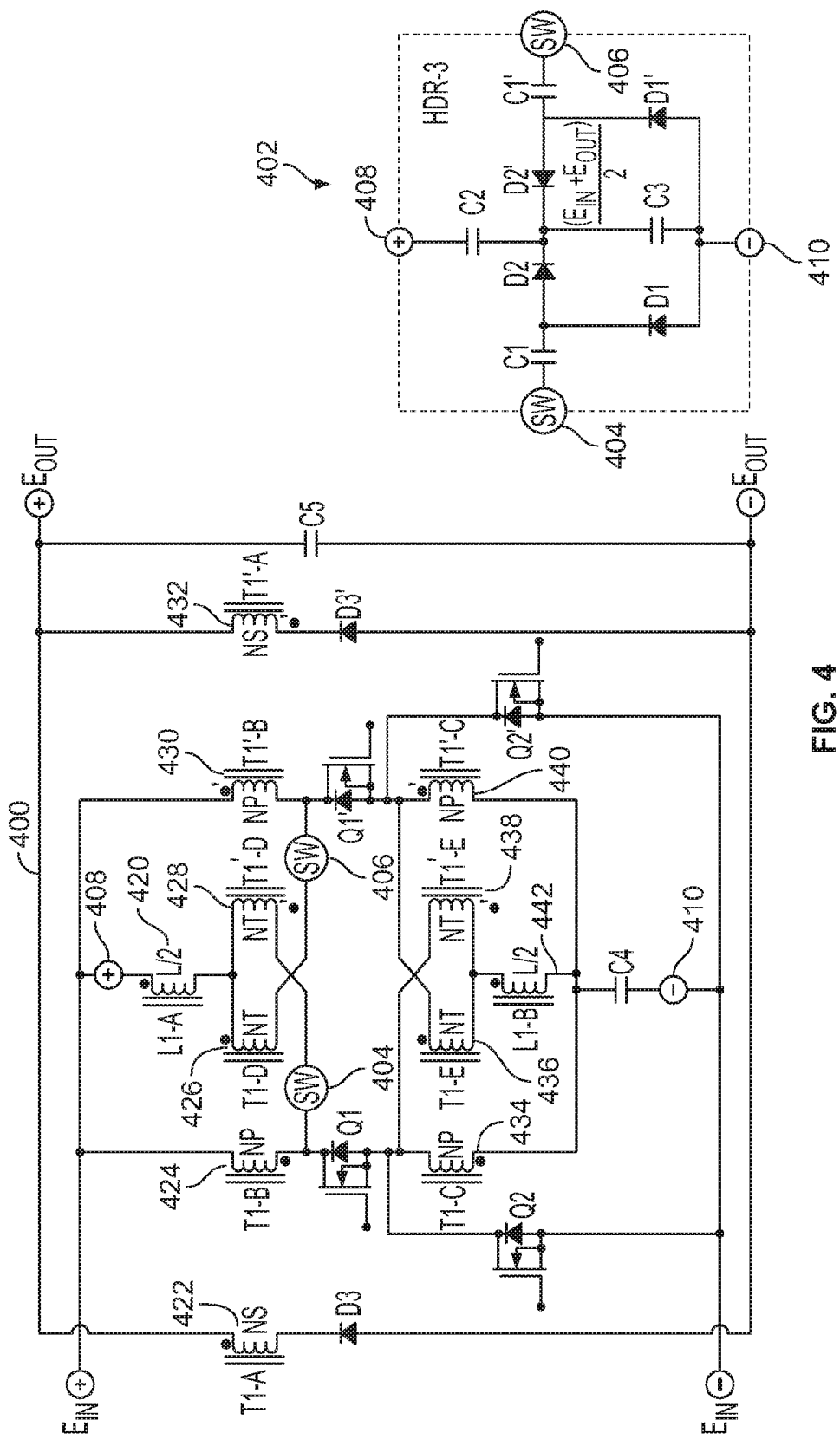
FIG. 4 illustrates an embodiment of a two-phase, three magnetic, Sepic-fed buck converter 400.

Other forms of HDR circuit can be designed to be coupled to other power converters to perform the LDC-CDL process. FIG. 4 illustrates an embodiment of a two-phase, three magnetic, Sepic-fed buck converter 400. An HDR 402 is coupled to converter 400 at connection points 404, 406, 408, and 410. In this example, the structure of HDR 402 is different from that of HDR circuit 152 in FIG. 1B in that HDR 402 utilizes the windings in converter 400 as the L portion of the LDC/CDL process, while HDR 152 includes additional windings T2-B and T2-B' (L portion). The windings are used to provide the conductive path for the CDL process. When Q1 (or Q1') is turned on, C2 and C2' are discharged through T2-B' and T2-B and current goes through D3. In a 3 magnetic device such as 400, there is no need to add additional magnetic windings to the HDR circuit because the functions of T2-B' and T2-B of HDR 152 are performed by T1-B and T1-B' in converter 400. In other words, the existing windings in the converter provide the conductive path for the CDL process. The windings are merged into the structure of a single magnetic winding.

In various embodiments, depending on the power converter circuit configuration, the HDR circuit may be configured differently. For the same power converter, different HDR circuit configurations are possible. Besides the examples described herein, there are other ways to connect the diodes and capacitors in the HDR circuit as well as multiple ways to connect the HDR circuit to the power converter to accomplish the LDC-CDL sequence.

One skilled in the art can design a HDR by following the following HDR design process which is used in some embodiments:

The value of leakage is computed using known techniques (e.g., according to the techniques described by Rueben Lee, "Electronic Transformers and Circuits" (second edition), John Wiley & Sons, New York, N.Y., 1961) to determine the L term. In the example of FIG. 1B, L is the parasitic inductance between T2-A and T2-C (or T2-A' and T2-C'). In the example of FIG. 4, parasitic inductance L is equivalently distributed in the discrete windings 420-442.

Given L and the harmonic frequency desired $1/(2\pi\sqrt{LC})$, the capacitance C is determined. The harmonic frequency $1/(2\pi\sqrt{LC})$ is chosen by the designer, and should be as low as possible, while minimizing energy losses. Some tradeoffs are made in the choice of the harmonic frequency, as a lower value (which reduces the voltage excursion) requires a bigger C value, but a bigger C results in higher transaction losses because the interval of conduction of the diodes is longer. There is compromise of transactional losses and containment of the voltage excursion. Further, the value of C should be selected as appropriate for the dielectric material selected to implement the circuit. In some embodiments, C is selected to be within the range of values appropriate for COG dielectric. In some embodiments, the harmonic frequency is selected to be 5 times the switching frequency. In some embodiments, if the C value determined is unsatisfactory, the magnetic windings are redesigned (e.g., changing winding sequences, changing the aspect ratio of the window, interleaving the windings, etc.) to achieve a different L that would allow the selection of a more appropriate C (e.g., a C having a capacitance value that leads to lower voltage excursion, lower transactional loss, and/or is within the range supported by the dielectric.)

The diodes (D) are selected based on transactional losses, which depends on the amount of current flowing through the diodes. Once L and C are chosen, the amount of current flowing through the diode can be predicted according to $$\Delta I = \frac{V}{L} dt$$

A diode must be able to handle the predicted amount of current.

There are different ways to connect inductors, diodes, etc. to accomplish the LDC/CDL sequence. Generally, the leakage energy is stored in the parasitic inductance L and can be transferred via a diode to a capacitor C. After a quiescent period, the energy stored in the capacitor C is transferred via another diode through the same inductance L to the load. A circuit that provides resonant commutation in that L and C have a resonant frequency (harmonic frequency), and performs displacement in that at some point in time the circuit performs the LDC process, and at a later point in time the circuit performs CDL process.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of reducing voltage excursions in a circuit comprising a converter portion and a harmonic displacement reduction (HDR) portion, the method comprising:
    performing resonant commutation to transfer, via a first set of one or more diodes included in the HDR portion, energy stored by a set of one or more parasitic inductances included in the converter portion to a set of one or more capacitors included in the HDR portion, including:
        causing a current to flow through at least some of the set of one or more parasitic inductances included in the converter portion; and
        stopping the current from flowing through the at least some of the set of one or more parasitic inductances included in the converter portion and redirecting the current to flow through at least some of the first set of one or more diodes included in the HDR portion to charge the set of one or more capacitors included in the HDR portion; and
    performing recovery-to-load, including:
        discharging the charged set of one or more capacitors via a second set of one or more diodes, thereby causing a current to flow through the second set of one or more diodes and energy to be inductively transferred to a load of the circuit.

2. The method of claim 1, wherein the resonant commutation is performed in a first state, and the recovery-to-load is performed in a second state.

3. The method of claim 1, further comprising performing DC-DC power conversion.

4. The method of claim 1, wherein the energy is stored by the set of one or more parasitic inductances while a first switch in the converter portion is on and a second switch in the converter portion is off.

5. The method of claim 1, wherein performing resonant commutation includes switching a first switch in the converter portion from on to off while keeping a second switch in the converter portion off.

6. The method of claim 5, wherein switching the first switch from on to off causes a current to cease flowing through the switch and to be commutated through a diode to charge a capacitor.

7. The method of claim 5, wherein performing recovery-to-load includes switching the second switch on while keeping the first switch off.

8. A harmonic displacement reduction (HDR) circuit comprising:
    a set of one or more capacitors;
    a first set of one or more diodes coupled to the set of one or more capacitors, and
    a second set of one or more diodes coupled to a source; wherein:
    each of the set of one or more capacitors has a first lead that is coupled to one or more corresponding leads of one or more diodes in the first set of one or more diodes, and a second lead that is configured to be coupled to a corresponding lead of a corresponding switch included in a second circuit;
    each of the first set of one or more diodes has a first lead that is coupled to a corresponding lead of a corresponding one of the set of one or more capacitors, and a second lead that is coupled to a corresponding lead of another one of the first set of one or more diodes;
    each of the second set of one or more diodes has at least one lead that is coupled to a corresponding lead of a source of the second circuit and wherein
    the first set of one or more diodes, the set of one or more capacitors, and the second set of one or more diodes are configured to:
        perform resonant commutation to transfer, via the first set of one or more diodes, energy stored by a set of one or more parasitic inductances to the set of one or more capacitors, the set of one or more parasitic inductances being included in the second circuit, and to perform the resonant commutation including to:
            cause a current to flow through at least some of the set of one or more parasitic inductances included in the second circuit; and
            stop the current from flowing through the at least some of the set of one or more parasitic inductances included in the second circuit and redirect the current to flow through at least some of the first set of one or more diodes to charge the set of one or more capacitors; and
        perform recovery-to-load, including to:
            discharge the charged set of one or more capacitors via the second set of one or more diodes, thereby causing a current to flow through the second set of one or more diodes and energy to be inductively transferred to a load of the second circuit.

9. The circuit of claim 8, wherein the set of one or more parasitic inductances comprises an interstitial parasitic inductance of magnetic windings of an inductor.

10. The circuit of claim 8, wherein the set of one or more capacitors include C0G dielectric.

11. A power converter circuit, comprising:
    a converter portion comprising a set of one or more parasitic inductances and a source; and
    a harmonic displacement reduction (HDR) portion coupled to the converter portion, the HDR portion comprising a first set of one or more diodes, a second set of one or more diodes, and a set of one or more capacitors, wherein:

each of the set of one or more capacitors has a first lead that is coupled to one or more corresponding leads of one or more diodes in the first set of one or more diodes, and a second lead that is configured to be coupled to a corresponding lead of a corresponding switch included in a second circuit;

each of the first set of one or more diodes has a first lead that is coupled to a corresponding lead of a corresponding one of the set of one or more capacitors, and a second lead that is coupled to a corresponding lead of another one of the first set of one or more diodes;

each of the second set of one or more diodes has at least one lead that is coupled to a corresponding lead of a source of the second circuit and wherein the HDR portion is configured to:
  perform resonant commutation to transfer, via the first set of one or more diodes, energy stored by the set of one or more parasitic inductances to the set of one or more capacitors, including to:
    cause a current to flow through at least some of the set of one or more parasitic inductances included in the converter portion; and
    stop the current from flowing through the at least some of the set of one or more parasitic inductances and redirect the current to flow through at least some of the first set of one or more diodes to charge the set of one or more capacitors; and
  perform recovery-to-load, including to:
    discharge the charged set of one or more capacitors via the second set of one or more diodes, thereby causing a current to flow through the second set of one or more diodes and energy to be inductively transferred to a load of the power converter circuit.

12. The power converter circuit of claim 11, wherein the converter portion is a DC-DC converter.

13. The power converter circuit of claim 11, wherein the converter portion is an isolated, multi-phase boost derived DC-DC converter.

14. The power converter circuit of claim 11, wherein the energy is stored by the set of one or more parasitic inductances while a first switch in the converter portion is on and a second switch in the converter portion is off.

15. The power converter circuit of claim 11, wherein the converter portion further comprises a first switch and a second switch, and wherein the HDR portion's performance of resonant commutation includes switching the first switch from on to off while keeping the second switch off.

16. The power converter circuit of claim 15, wherein the switching the first switch from on to off causes a current to cease flowing through the switch and to be commutated through a diode to charge a capacitor.

17. The power converter circuit of claim 15, wherein the HDR portion's performance of recovery-to-load includes switching the second switch on while keeping the first switch off.

* * * * *